(12) United States Patent
Ricks et al.

(10) Patent No.: US 6,308,116 B1
(45) Date of Patent: Oct. 23, 2001

(54) SYSTEM AND METHOD FOR INTEGRATING LNAV AND VNAV WITH AUTOPILOTS FOR EXISTING AIRCRAFT

(75) Inventors: Ralph D. Ricks, Huntington Beach, CA (US); Geoffrey L. Barrance, Marion, IA (US); Wayne A. Smith; Leo G. LaForge, both of Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/502,387

(22) Filed: Feb. 11, 2000

(51) Int. Cl.[7] ............................................ G06F 13/00
(52) U.S. Cl. ............................ 701/11; 244/175; 340/979
(58) Field of Search .......................... 701/11, 207, 210; 244/76 R, 175; 340/979

(56) References Cited

U.S. PATENT DOCUMENTS

| | | | | |
|---|---|---|---|---|
| 3,862,717 | * | 1/1975 | Lehfeldt | 701/14 |
| 5,023,796 | * | 6/1991 | Kahler | 701/7 |
| 5,820,080 | * | 10/1998 | Eschenbach | 244/183 |
| 6,112,141 | * | 8/2000 | Briffe et al. | 701/14 |

* cited by examiner

Primary Examiner—Michael J. Zanelli
Assistant Examiner—Eric M. Gibson
(74) Attorney, Agent, or Firm—Nathan O. Jensen; Kyle Eppele

(57) ABSTRACT

An avionics system for retrofitting a GPS system to work with an existing autopilot by using signal switching and conditioning in an electronic flight display to accomplish the switching without the need for logic controlled relays in the GPS to autopilot interconnect wiring.

19 Claims, 4 Drawing Sheets

SYSTEM AND METHOD FOR INTEGRATING LNAV AND VNAV WITH AUTOPILOTS FOR EXISTING AIRCRAFT

FIELD OF THE INVENTION

The present invention generally relates to aviation electronics, or avionics, and more particularly relates to global navigation, and even more particularly relates to a system and method for integrating LNAV and VNAV features of a global navigation system with an autopilot on an existing aircraft.

BACKGROUND OF THE INVENTION

In the past, designers of avionics systems have endeavored to provide systems with improved reliability and improved functionality. One example of such improvements is the incorporation of global navigation capabilities using the global positioning system (GPS). The GPS system has gained widespread acceptance across various fields of endeavor, including aviation. Global Navigation and Landing Units, GNLUs are becoming very common on new commercial air transport aircraft. These GNLUs can be used to provide enhanced lateral navigation (LNAV) and vertical navigation (VNAV) capabilities. However, it often is difficult to integrate this equipment with the many other interrelated avionics equipment on a typical existing commercial air transport aircraft. One particular example of integration is with an autopilot system. Often, complex interconnect hardware is required to couple a GNLU system with an autopilot on an existing aircraft. While these complex interconnect schemes have been used extensively in the past, for example on DC 9 aircraft manufactured by McDonnel Douglas, they also have significant drawbacks.

First of all, the system often requires t e addition of new interconnect wiring with complex logic controlled switching circuitry between the GNLU and the autopilot.

Secondly, in the DC 9 applications, as well as others, it also required expensive and time consuming changes to be made to the autopilot system itself.

Consequently, there exists a need for improvement in systems and methods for retrofitting GNLU systems with autopilots on existing aircraft.

SUMMARY OF THE INVENTION

It is an object of the present invention to provide a simplified interconnect system.

It is a feature of the present invention to use electronic flight instruments in the integration of a GNLU with an autopilot.

It is an advantage of the present invention to reduce the undesired complexity of interconnect wiring dedicated for interconnecting a GNLU with an autopilot.

It is another advantage of the present invention to reduce the weight of the interconnect wiring dedicated to interconnecting a GNLU with an autopilot.

It is yet another advantage to reduce required modifications to the autopilot system while retrofitting an aircraft with a GNLU.

It is still another advantage of the present invention to increase the reliability of the GNLU by avoiding the use of often unreliable interconnect relays between the GNLU and the autopilot.

The present invention is an apparatus and method for retrofitting a GNLU with an autopilot, which are designed to satisfy the aforementioned needs, provide the previously stated objects, include the above-listed features, and achieve the already articulated advantages. The present invention is carried out with a "relay-less interconnect" in a sense that the complexity and weight of an interconnect relay system has been eliminated.

Accordingly, the present invention is system and method for retrofitting a GNLU with an autopilot which includes the use of electronic flight instruments to perform coupling of an LNAV and/or VNAV capabilities with an existing autopilot.

BRIEF DESCRIPTION OF THE DRAWINGS

The invention may be more fully under stood by reading the following description of the preferred embodiments of the invention, in conjunction with the appended drawings wherein.

DETAILED DESCRIPTION

Figure 1:
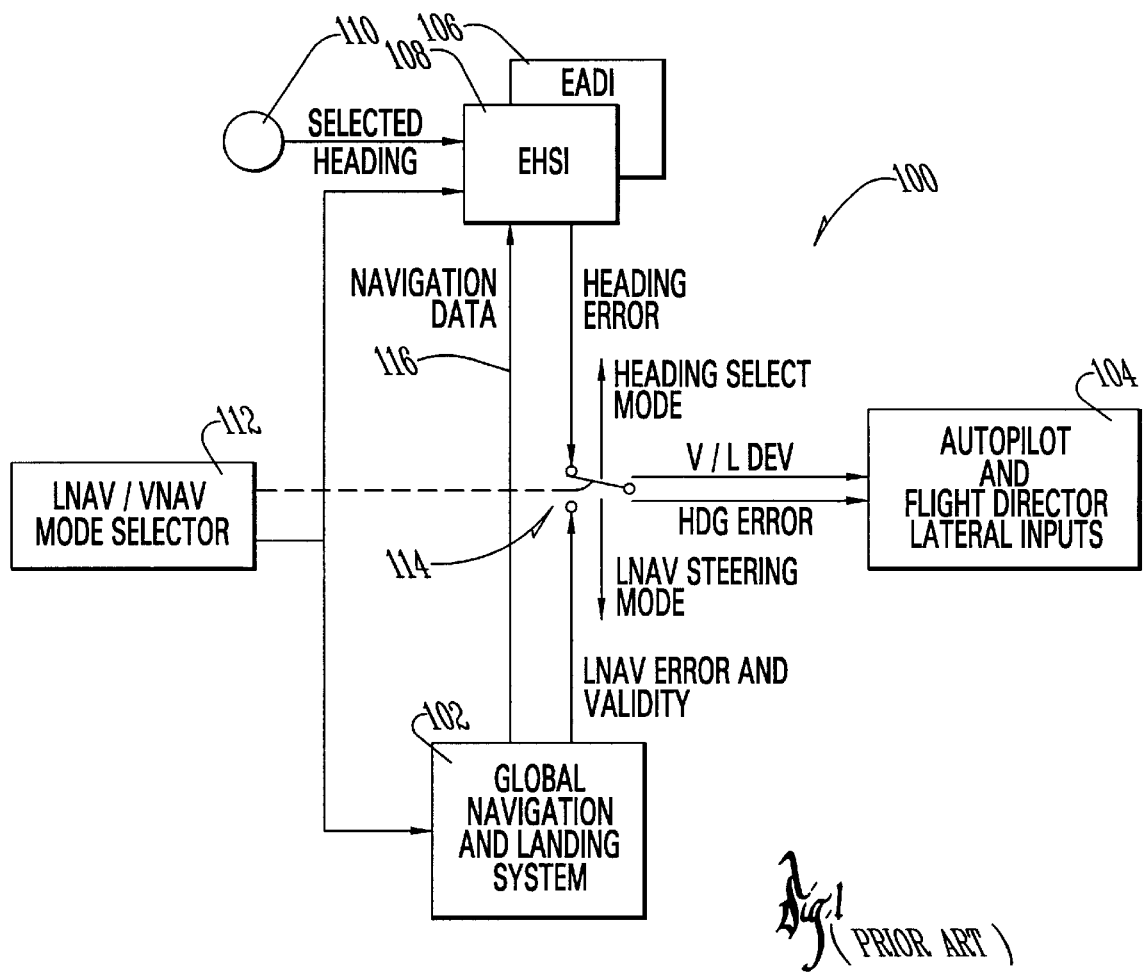
FIG. 1 is a simplified block diagram of a retrofitting scheme of the prior art, which is focused upon the LNAV mode of operation.

Now referring to the drawings, wherein like numerals refer to like matter throughout, and more particularly to FIG. 1, there is shown a system of the prior art, generally designated 100, which includes a global navigation and landing system 102, which may be a GPS based navigation system or other wide area navigation system. FIG. 1 focuses primarily upon the LNAV mode while FIG. 3 primarily focuses on the VNAV mode. Global navigation and landing system 102 provides information pertaining to LNAV roll steering and valid information, as well as VNAV pitch steering and valid information, in a manner which is well known in the art. An auto pilot roll and pitch axes 104 represent a portion of a prior art autopilot system relating to roll and pitch axes, which has been adapted from conventional prior art autopilots to accommodate these LNAV and/or VNAV signals. Electronic attitude director indicator 106 is a typical EADI of the prior art. Electronic horizontal situation indicator 108 is a typical EHSI of the prior art. A digital data bus 116 provides navigation data from global navigation and landing system 102 for use by the display's electronic attitude director indicator 106 and electronic horizontal situation indicator 108. Coupled to electronic attitude director indicator 106 and electronic horizontal situation indicator 108 is desired heading selector 110, which is a well-known apparatus for inputting desired heading information into the electronic attitude director indicator 106 and electronic horizontal situation indicator 108. A heading error/datum signal representing a difference between the selected heading and actual heading information can either be provided by other navigation sources on the aircraft such a inertial reference systems, radio navigation systems, and compasses etc, or computed by the EHSI 108 and/or EADI 106. This heading error/datum is provided as an input to the auto pilot roll and pitch axes 104 when interconnect relay and logic system 114 is configured to be in the Heading Select Mode. When LNAV mode selector and annunciator control 112 provides a signal representing the pilot's desire to use LNAV as a source of input for the autopilot, then information is routed from global navigation and landing system 102 through interconnect relay and logic system 114 to a to pilot roll and pitch axes 104. The above system is representative of various prior art systems, including those installed and operating on many DC 9 aircraft, as well as various other aircraft.

Figure 2:
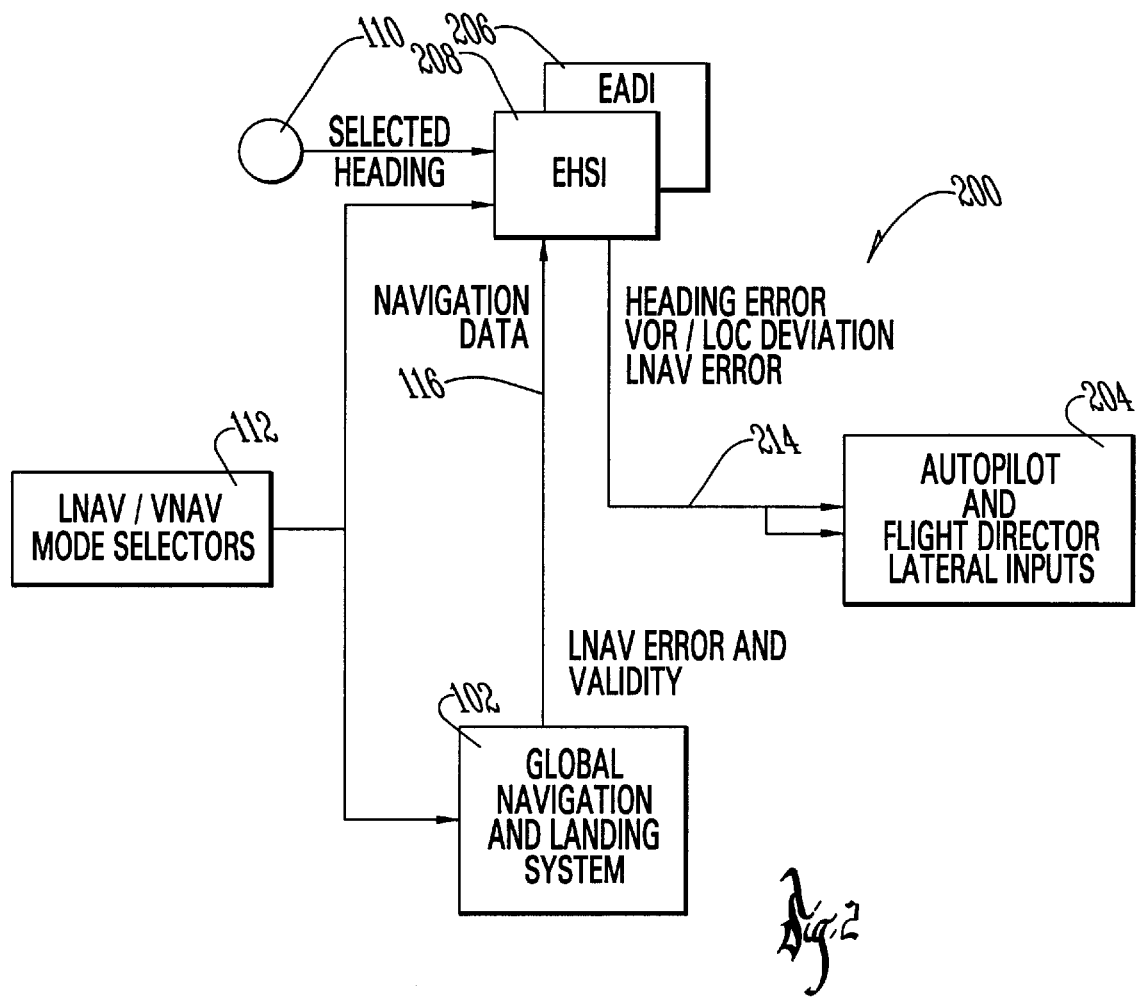
FIG. 2 is a simplified block diagram of a GNLU retrofitting scheme of the present invention, which is focused on the LNAV mode of operation.

Now referring to FIG. 2, there is shown an avionics system of the present invention, generally designated 200, which is primarily focused upon the LNAV mode of operation, including a global navigation and landing system 102 and a standard autopilot roll/pitch axes 204, which is similar to autopilots installed on many aircraft and is different from global navigation and landing system 102 (FIG. 1) in that it does not include numerous changes to the autopilot to accommodate the use of LNAV and/or VNAV capabilities provided by global navigation and landing system 102. The present invention also includes improved electronic attitude director indicator 206 and improved electronic horizontal situation indicator 208, which are similar to electronic attitude director indicator 106 and electronic horizontal situation indicator 108 (FIG. 1) except that they are modified to perform LNAV/VNAV and Heading select mode switching and associated logic, which is similar to that which is performed by interconnect relay and logic system 114 (FIG. 1). Improved electronic attitude director indicator 206 and improved electronic horizontal situation indicator 208 are preferably capable of extracting LNAV and/or VNAV guidance signals from navigation data provided on digital data bus 16 from global navigation and landing system 102. Improved electronic attitude director indicator 206 and improved electronic horizontal situation indicator 208 also would preferably implement logic and interlocks required for LNAV and/or VNAV engagement and disengagement, thereby simplifying the interconnect lines 214, which now can be merely a standard wiring harness. Improved electronic attitude director indicator 206 and improved electronic horizontal situation indicator 208 may also perform additional signal conditioning functions to improve the coupling performance between the standard autopilot roll/pitch axes 204, the global navigation and landing system 102 (LNAV and/or VNAV) and the improved electronic attitude director indicator 206 and improved electronic horizontal situation indicator 208. This signal conditioning may include, but need not be limited to, the following: phase advance (to overcome any sluggishnes in the response) and/or gain variation (to address non-linearity or varying aircraft configuration or flight regimes). Improved electronic attitude director indicator 206 and improved electronic horizontal situation indicator 208 receive desired heading information from desired heading selector 110 in a well-known manner, but now also receive from LNAV/VNAV mode selector and annunciator control 112 the LNAV and/or VNAV mode select information.

Figure 3:
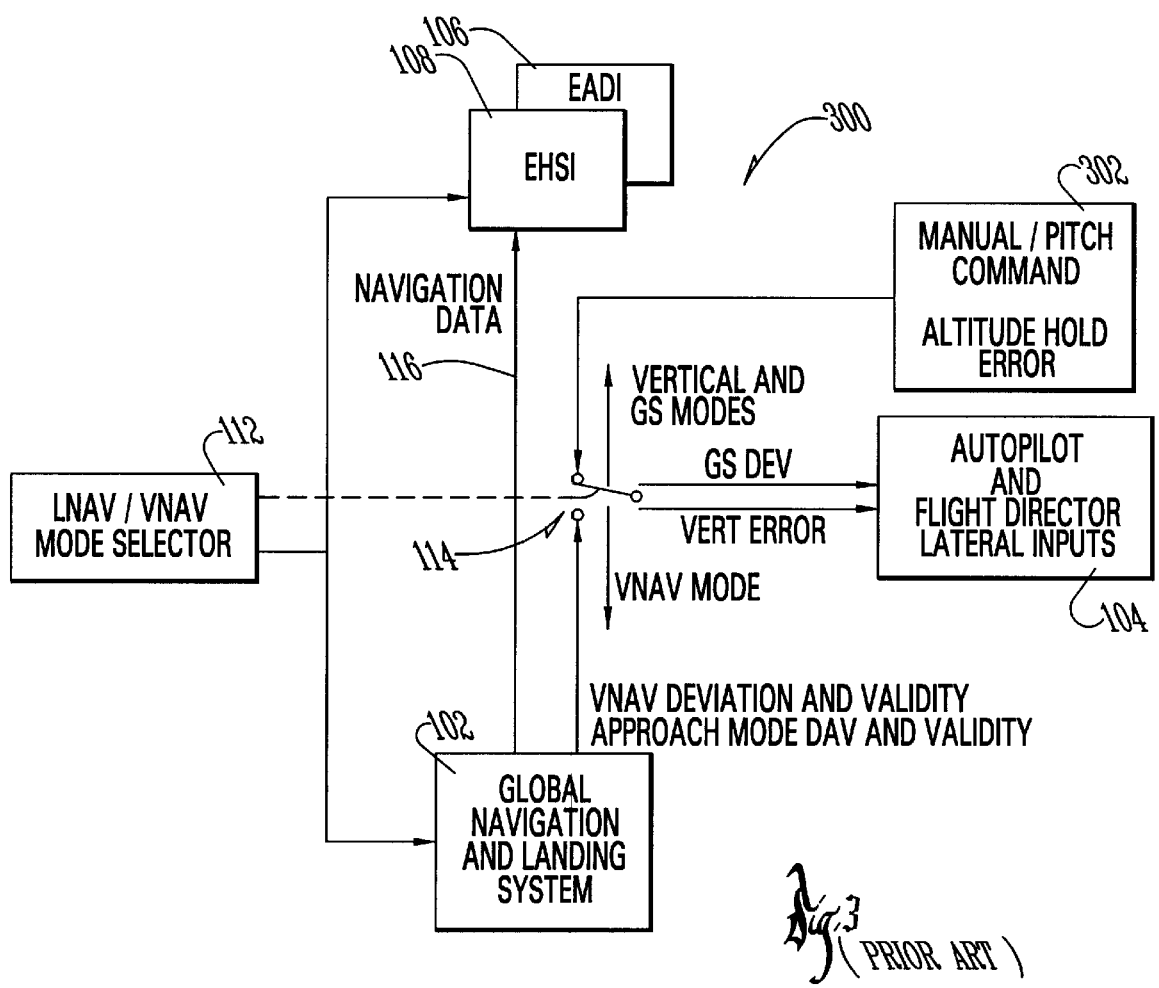
FIG. 3 is a simplified block diagram of a retrofitting scheme of the prior art focused upon the VNAV mode operation.

Now referring to FIG. 3, there is shown a system of the prior art, generally designated 300, which is primarily for used upon the VNAV mode of operation. As a VNAV implementation, there is also shown an input 302 for Manual pitch command and/or altitude hold error signals.

Figure 4:
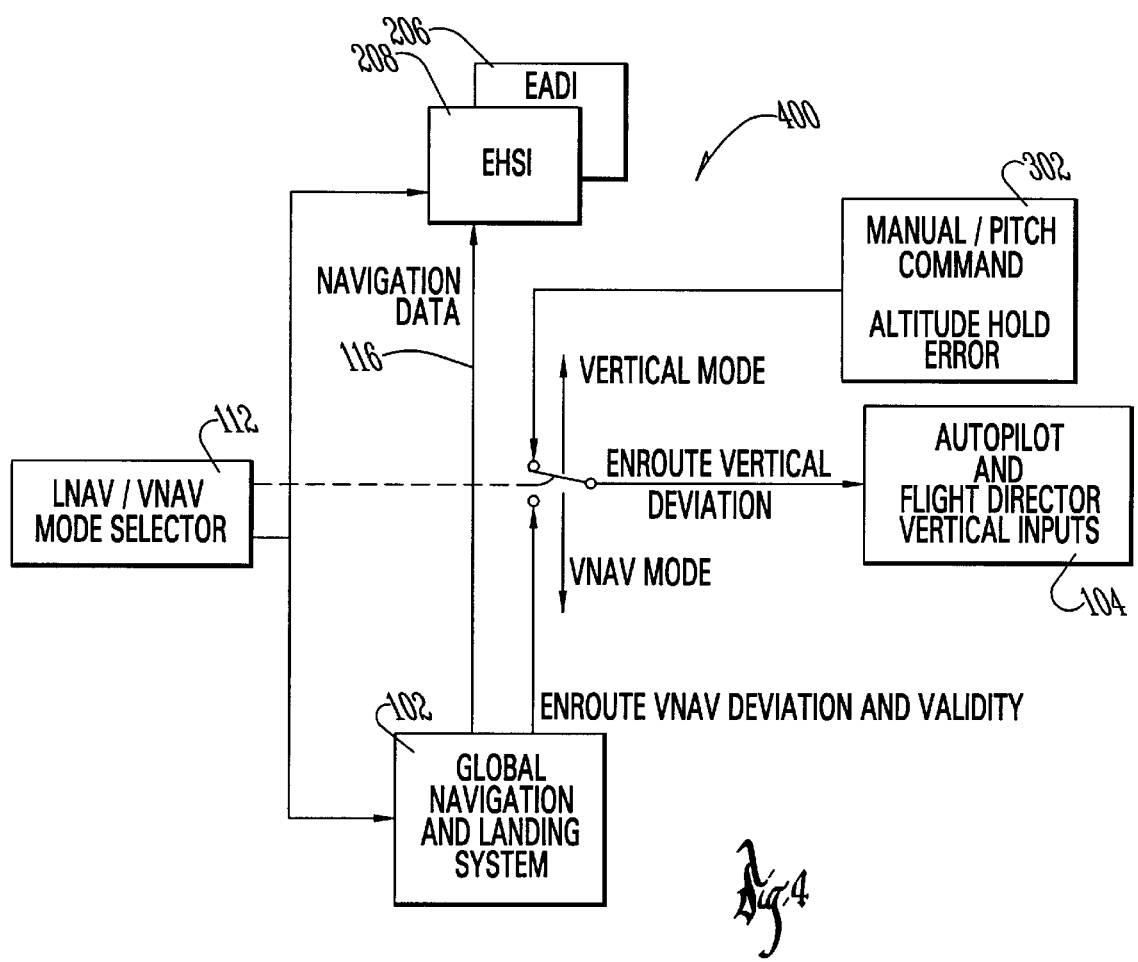
FIG. 4 is a simplified block diagram of a GNLU retrofitting scheme of the present invention which is focused upon the LNAV mode of operation.

Now referring to FIG. 4, there is shown a system of the present invention, generally designated 400, which is primarily focused upon the VNAV mode of operation. The EADI 206 and the EHSI 208 are the same as those in FIG. 2; however, here they are shown as electronically performing glide slope and VNAV operations as opposed to the LNAV/VOR/LOC functions which are highlighted in FIG. 2.

In operation, the present invention could operate in a typical manner as follows: during a portion of the flight over North America, the pilot can select a desired heading as is customary, the improved electronic attitude director indicator 206 and improved electronic horizontal situation indicator 208 provide heading error/datum signals to the standard autopilot roll/pitch axes 204 in a well-known manner. However, if the flight extends over an ocean or remote regions, the pilot can now operate LNAV/VNAV mode selector and annunciator control 112 to select LNAV and/or VNAV, thereby causing improved electronic attitude director indicator 206 and improved electronic horizontal situation indicator 208 to substitute LNAV and/or VNAV guidance signals s to standard autopilot roll/pitch axes 204. This switching to LNAV and/or VNAV can be accomplished without any need for changes to the existing standard autopilot roll/pitch axes 204, and the interconnect lines 214, which have already been certified by the FAA or other airworthiness authorities.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An avionics system comprising:
   a desired heading selector for providing desired heading information;
   an LNAV/VNAV mode selector for providing mode select instructions;
   a global navigation system for providing global digital navigation data;
   an electronic indicator, coupled to said global navigation system via a digital data bus, and to the LNAV/VNAV mode selector to receive mode select instructions and to the desired heading selector to receive desired heading information; said electronic indicator for extracting navigation guidance signals from said global digital navigation data and further for selectively outputting heading error/datum signals and navigation steering signals in response to said mode select instructions;
   simplified interconnect lines coupled to said electronic indicator for routing said heading error/datum signals and navigation steering signals; and
   an autopilot having standard autopilot roll/pitch axes connected to the simplified interconnect lines, for receiving said heading error/datum signals and navigation steering signals and generating aircraft control signals in response thereto.

2. An avionics system of claim 1 wherein said navigation guidance signals include LNAV guidance signals, and said navigation steering signals include LNAV roll steering signals.

3. An avionics system of claim 2 wherein said electronic indicator performs phase advance signal conditioning.

4. An avionics system of claim 1 wherein said navigation guidance signals include VNAV guidance signals and said navigation steering signals include VNAV pitch steering signals.

5. An avionics system of claim 4 wherein said navigation guidance signals further include LNAV guidance signals and said navigation steering signals further include LNAV roll steering signals.

6. An avionics system of claim 5 wherein said electronic indicator performs phase advance signal conditioning.

7. An avionics system of claim 6 wherein said electronic indicator further performs gain variation signal conditioning.

8. An avionics system of claim 1 wherein said electronic indicator is coupled to said autopilot via the simplified interconnect lines that comprise a standard wiring harness free of intermediate logic controlled relays.

9. An avionics system of claim 1 wherein said electronic indicator is an improved electronic horizontal situation indicator that performs LNAV/VNAV and heading select mode switching.

10. An avionics system of claim 1 wherein said electronic indicator is an improved electronic attitude director indicator that performs LNAV/VNAV and heading select mode switching.

11. An avionics system of claim 1 wherein said electronic indicator is an improved electronic horizontal situation indicator that performs LNAV and/or VNAV engagement and disengagement.

12. An avionics system of claim 1 wherein said electronic indicator is an improved electronic attitude director indicator that performs LNAV and/or VNAV engagement and disengagement.

13. An avionics system for providing autopilot functions in response to a global navigation system comprising:

an existing autopilot on an existing aircraft, where said autopilot has issued aircraft control signals that have controlled said existing aircraft in flight;

means for providing global navigation data;

means for displaying attitude characteristics of an aircraft in response to said global navigation data;

means for selectively providing heading error/datum signals and navigation steering signals to said existing autopilot in a format that existing hardware characteristics of said existing autopilot remains unchanged; and a wiring system that is free from logic controlled relays and that couples said existing autopilot and said means for selectively providing.

14. An avionics system of claim 13 wherein said means for selectively providing error/datum signals and navigation steering signals provides LNAV roll steering signals.

15. An avionics system of claim 13 wherein said means for selectively providing further provides a display of information.

16. An avionics system of claim 15 wherein said means for selectively providing is an electronic horizontal situation indicator.

17. A method of controlling an aircraft autopilot comprising the steps of:

providing global navigation data over a wiring system;

providing a heading error signal over said wiring system;

providing a display device;

providing an autopilot, coupled to said display device by said wiring system;

selectively switching data input into said autopilot by switching between said navigation data and said heading error signal without having a logic controlled relay in said wiring system.

18. A method of claim 17 further comprising the steps of conditioning said data input into said autopilot by performing a phase advance operation.

19. A method of claim 18 further comprising the steps of conditioning said data input into said autopilot by performing a gain variation operation.

* * * * *